United States Patent [19]
Ashizuka

[11] Patent Number: 5,272,516
[45] Date of Patent: Dec. 21, 1993

[54] FIBER OPTIC ROTATION SENSOR INCLUDING A TEMPERATURE SENSOR AND LOGIC CIRCUIT STORING AT LEAST TWO CORRELATION MAPS

[75] Inventor: Norihiro Ashizuka, Ibaraki, Japan
[73] Assignee: Hitachi Cable Ltd., Tokyo, Japan
[21] Appl. No.: 845,030
[22] Filed: Mar. 3, 1992
[30] Foreign Application Priority Data May 14, 1991 [JP] Japan ................ 3-109308

[51] Int. Cl.⁵ .............................. G01C 19/72
[52] U.S. Cl. ................................ 356/350
[58] Field of Search ................ 356/350, 345; 250/227.19, 227.27

[56] References Cited

U.S. PATENT DOCUMENTS 5,020,913 6/1991 Okada et al. .................. 356/350
5,080,488 1/1992 Buehler et al. ............... 356/350

FOREIGN PATENT DOCUMENTS 2157425 10/1985 United Kingdom .............. 356/350

*Primary Examiner*—Samuel A. Turner
*Attorney, Agent, or Firm*—Helfgott & Karas

[57] ABSTRACT

A fiber optic rotation sensor includes a logic circuit which is supplied with an ambient temperature from a temperature sensor, a light output from an optical fiber sensing loop, and at least two correlation maps from a memory. The correlation maps are prepared at predetermined temperatures by light output values and angular velocities corresponding to the light output values. The logic circuit selects two correlation maps of two temperatures, between which the detected ambient temperature ranges, and provides an angular velocity in accordance with the two temperatures, the detected ambient temperature, and the light output by using the selected two correlation maps.

4 Claims, 4 Drawing Sheets

FIBER OPTIC ROTATION SENSOR INCLUDING A TEMPERATURE SENSOR AND LOGIC CIRCUIT STORING AT LEAST TWO CORRELATION MAPS

FIELD OF THE INVENTION

The invention relates a fiber optic rotation sensor, and more particularly to, an angular velocity sensor utilizing an optical fiber sensing loop to be compensated by temperature.

BACKGROUND OF THE INVENTION

Conventional fiber optic rotation sensors have been known as Sagnac gyroscopes in which a light emitted from a light source is divided into two lights to be propagated through an optical fiber sensing loop in clockwise and counter-clockwise directions, respectively, the two lights are coupled after the propagation to provide interference light outputs to be supplied to a light receiver for converting light signal to electric signal, and the converted electric signal is processed in a logic circuit to calculate an angular velocity.

In the conventional fiber optic sensor, a relativistic inertia effect to be defined "Sagnac effect" in which a propagation time difference of the two lights propagated through the optical fiber sensing loop in the opposite directions, that is, a phase difference of the two lights is proportional to an angular velocity of the optical fiber sensing loop is utilized. In practical fiber optic sensors, the phase difference is not directly detected, but indirectly detected in a change of light outputs, as defined by an equation (1).

$$Ps = Ps_1 + Ps_2 + 2Ps_1 Ps_2 \cos\Delta\phi \quad (1)$$

where Ps is a light output value, $Ps_1$ and $Ps_2$ are clockwise and counter-clockwise directional components of the light output value, respectively, and $\Delta\phi$ is a phase difference.

A relation between the phase difference $\Delta\phi$ and an angular velocity (deg/sec) is defined by an equation (2).

$$\Delta\phi = (8\pi S/\lambda C) \times \Omega \quad (2)$$

where S is an area of the optical fiber sensing loop, $\lambda$ is a wavelength of light, C is a velocity of light and $\Omega$ is an angular velocity.

As understood from the equation (1), the light output value Ps is proportional to cos $\Delta\phi$. Consequently, a sensitivity of the fiber optic rotation sensor becomes low, when a rotation is very small. For this reason, a minute angular velocity can not be precisely detected. For the purpose of improving this disadvantage, a phase bias method in which a phase modulator consisting of, for instance, piezo-electric ceramic is utilized is adopted to provide the phase difference $\Delta\phi$ of the clockwise and counter-clockwise propagated lights with a shift of $\pi/2$. Thus, an equation (3) is defined.

$$Ps = \cos\Delta\phi' = \cos(\Delta\phi + \pi/2) = \sin\Delta\phi \quad (3)$$

In the fiber optic rotation sensor, a logic circuit includes a memory having a correlation map storing angular velocities relative to light output values, so that an angular velocity is read from the correlation map of the memory by accessing an address thereof determined by a detected light output.

In the fiber optic rotation sensor, an angle of the optical fiber sensing loop is detected in addition to the detection of an angular velocity. For this purpose, an angular velocity is integrated by time, so that an angle of the optical fiber sensing loop is obtained. This allows the fiber optic rotation sensor to be applied to a navigation system of a vehicle, a robot of a transportation system, etc.

However, the conventional fiber optic rotation sensor has a disadvantage in that the precision of detecting an angular velocity is not expected to be high, because optical parts such as an optical fiber, etc. used therein is affected in its light transmission property by the change of temperature, so that the dispersion of wavelength occurs to result in the temperature dependency of light output values. In other words, the correlation map included in the memory is prepared without considering the temperature dependency of the light transmission property.

SUMMARY OF THE INVENTION

Accordingly, it is an object of the invention to provide a fiber optic rotation sensor in which a precise detection of an angular velocity is realized without any influence of temperature.

It is a further object of the invention to provide a fiber optic rotation sensor in which a stabilized detection of an angular velocity is carried out, even if an ambient temperature is changed.

It is a still further object of the invention to provide a fiber optic rotation sensor in which a reliable detection of an angular velocity is realized in a wide range of temperature.

According to the invention, a fiber optic rotation sensor, comprises;

a light source for emitting a light signal;

means for dividing the light signal into first and second light signals;

an optical fiber sensing loop for propagating the first and second light signals in clockwise and counter-clockwise directions, respectively;

means for detecting light output signals composed of the first and second light signals after propagation through the optical fiber sensing loop;

a sensor for detecting an ambient temperature of the optical fiber sensing loop;

a memory for storing at least two correlation maps each defining a correlation between a light output value and an angular velocity at a temperature different from others; and a logic circuit for calculating an angular velocity of the optical fiber sensing loop in accordance with the light output signals and the ambient temperature by using two of the at least two correlation maps.

BRIEF DESCRIPTION OF THE DRAWINGS

This invention will be explained in more detail in conjunction with appended drawings, in which.

DESCRIPTION OF THE PREFERRED EMBODIMENT

Before explaining a fiber optic rotation sensor of a preferred embodiment according to the invention, a correlation map used in the aforementioned conventional fiber optic rotation sensor will be explained in FIG. 1.

Figure 1:
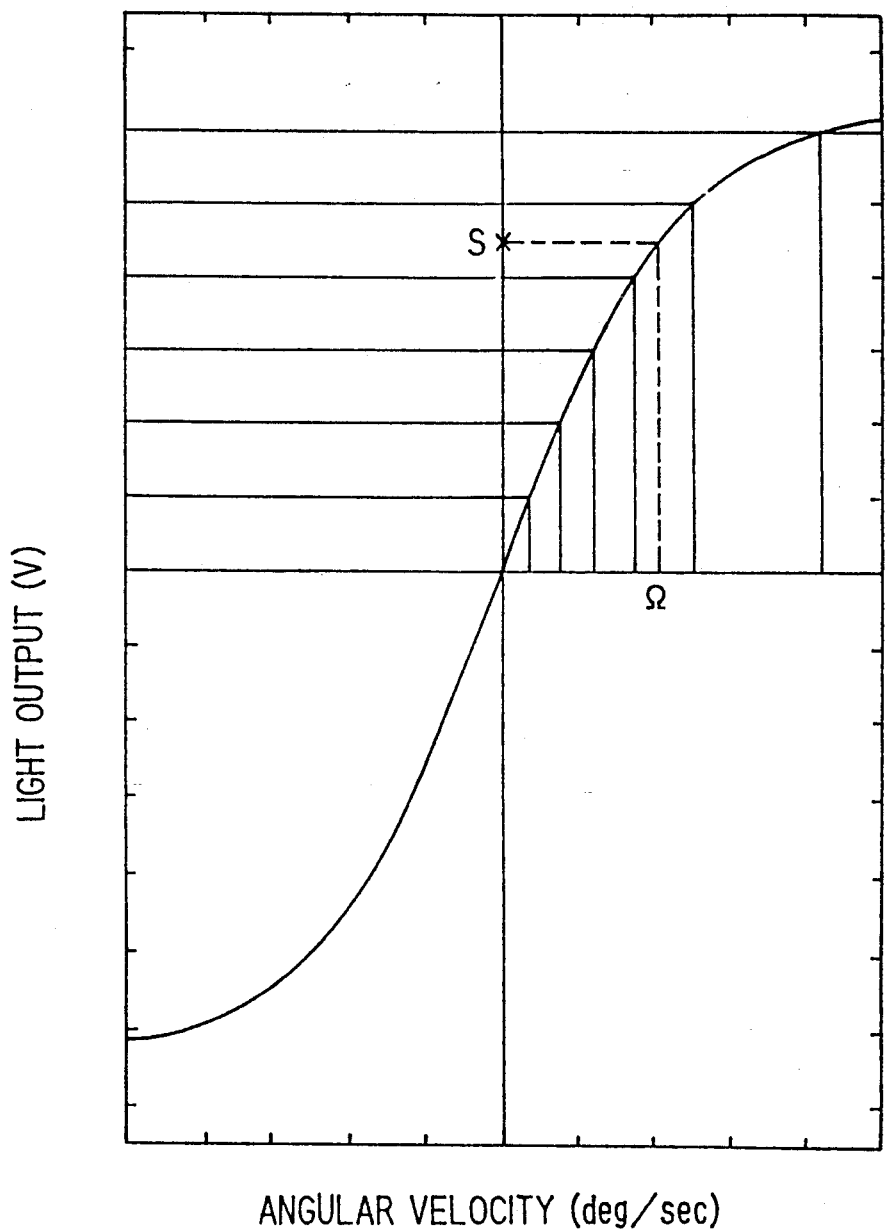
FIG. 1 is a graph showing a correlation map for calculating an angular velocity relative to a light output value in a conventional fiber optic rotation sensor.

FIG. 1 shows the correlation map included in a logic circuit of the conventional fiber optic rotation sensor. In operation, a light output signal is supplied from a light receiver consisting of, for instance, photodiodes to the logic circuit, in which the correlation map is accessed in accordance with the light output signal. Here, if it is assumed that a value of the light output is "S", an angular velocity is detected to be "$\Omega$" as shown in FIG. 1.

Figure 2:
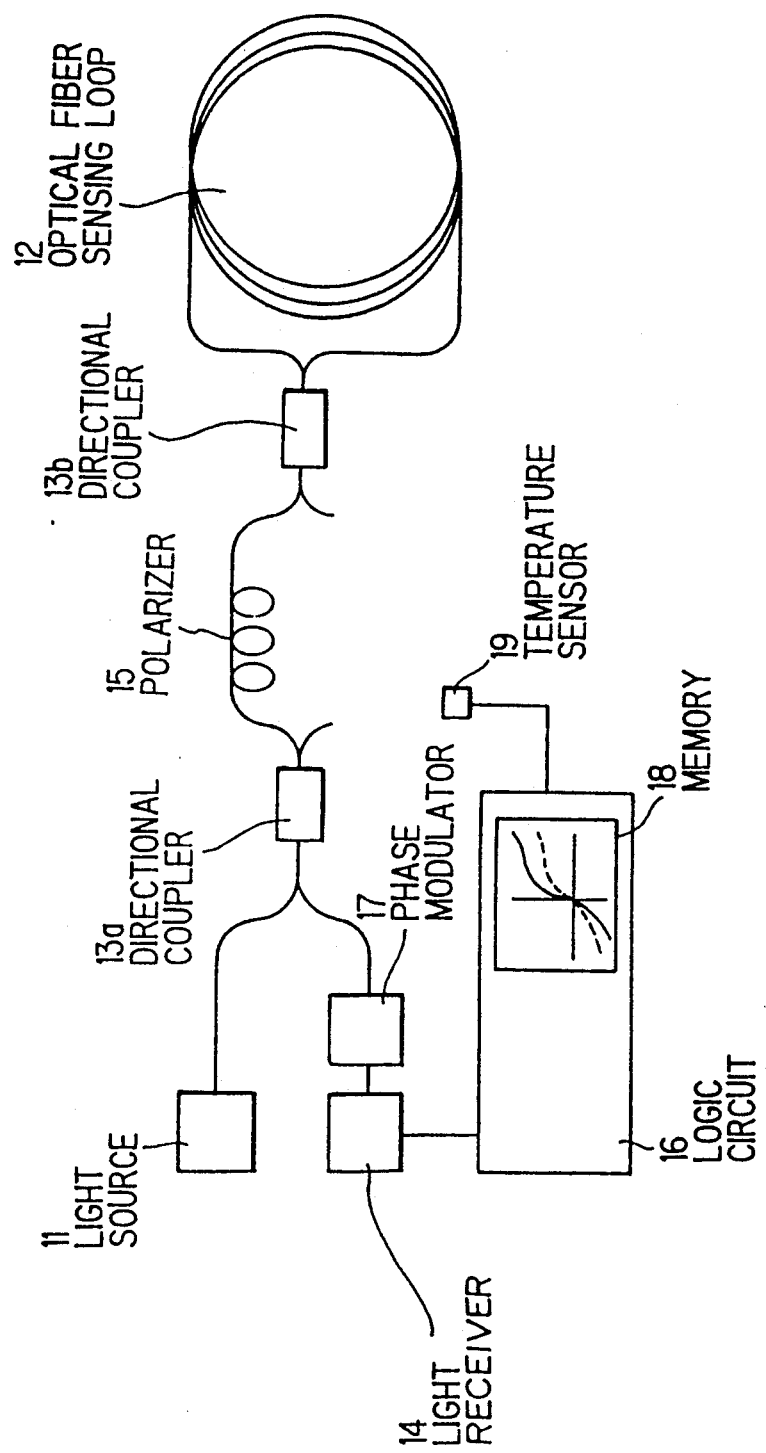
FIG. 2 is a block diagram showing a fiber optic rotation sensor of a preferred embodiment according to the invention.

Next, a fiber optic rotation sensor of a preferred embodiment according to the invention will be explained in FIG. 2. The fiber optic rotation sensor comprises a light source 11 such as a semiconductor laser for emitting a light, optical directional couplers 13a and 13b, a polarizer 15 of an optical fiber type for providing a linearly polarized light, an optical fiber sensing loop 12 through which two lights are propagated in clockwise and counter-clock-wise directions, a phase modulator 17 for shifting a phase difference $\Delta\phi$ of the two opposite direction-propagated lights by $\pi/2$, a light receiver 14 such as photodiodes for detecting an output light supplied from the phase modulator 17, a logic circuit 16 including a memory 18, and a temperature sensor 19 for detecting a temperature to be supplied to the logic circuit 16, wherein the logic circuit 16 carries out the calculation of the aforementioned equations (1) to (3) and other equations (to be explained later) to provide an angular velocity by accessing a correlation map included in the memory 18.

Figure 3:
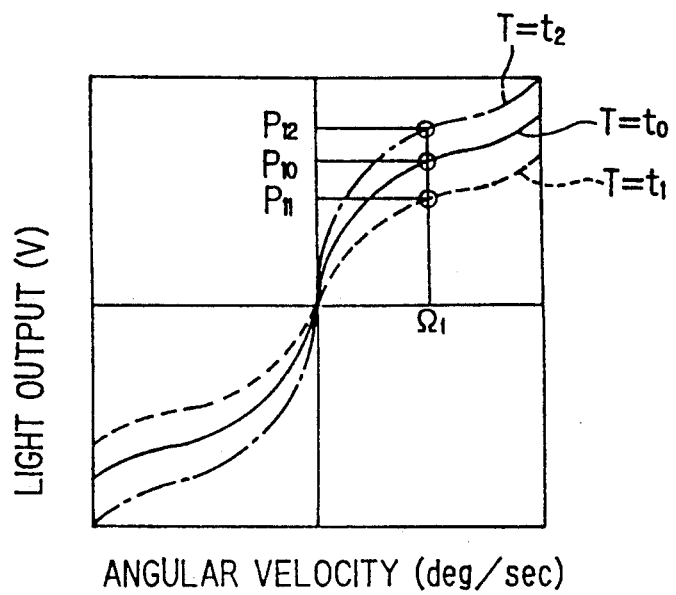
FIG. 3 is a graph showing a correlation map for calculating an angular velocity relative to a light output value in the fiber optic rotation sensor of the preferred embodiment.

FIG. 3 shows the correlation maps included in the memory 18 in which three curves "$T=t_0$", "$T=t_1$" and "$T=t_2$" are stored to provide angular velocities in accordance with detected light outputs.

In operation, a light emitted from the light source 11 is supplied through the optical directional coupler 13a to the polarizer 15, from which a linearly polarized light is supplied to the optical directional coupler 13b. The linearly polarized light is divided in the optical directional coupler 13b into two linearly polarized lights to be supplied to the optical fiber sensing loop 12, through which the two lights are propagated in the clockwise and counter-clockwise directions. Then, the two propagated lights are supplied from the optical fiber sensing loop 12 to the optical directional coupler 13b, so that the two output lights are combined to provide interference lights which are then supplied through the polarizer 15 to the optical directional coupler 13a. Thus, the lights are supplied from the optical directional coupler 13a to the phase modulator 17, in which a phase difference $\Delta\phi$ of the two lights is shifted by $\pi/2$. Then, the phase shifted lights are supplied to the light receiver 14, in which the output lights are converted to electric signals to be supplied to the logic circuit 16. At the same time, a signal of a temperature is supplied from the temperature sensor 19 to the logic circuit 16.

Figure 4:
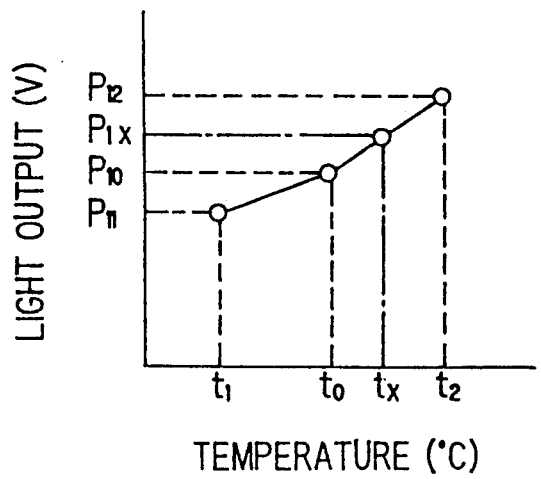
FIG. 4 is a graph showing a relation between a light output value and a temperature in the fiber optic rotation sensor of the preferred embodiment.

Here, it is assumed that a temperature detected by the temperature sensor 19 is "$t_x$" which is ranged between the temperature $t_0$ and $t_2$ as shown in FIG. 4. On the other hand, no curve defining a correlation at the temperature ($T=t_x$) between a light output and an angular velocity is stored in the memory 18. In this case, a calculation defined by an equation (4) is carried out.

$$P_{1x} = P_{10} + (t_x - t_{e0}) X (P_{12} - P_{10}) / (t_2 - t_0) \tag{4}$$

where $P_{1x}$ is a light output value detected at the temperature tx, and $P_{10}$ and $P_{12}$ are light output values at the temperatures $t_0$ and $t_2$, by which an angular velocity is obtained in accordance with the correlation curves "$T=t_0$" and "$T=t_2$" as shown in FIG. 3.

An equation (5) is obtained from the equation (4).

$$P_{10} = P_{1x} + (t_x - t_{e0}) X (P_{12} - P_{10}) / (t_2 - t_0) \tag{5}$$

The equation (5) means that an angular velocity $\Omega_x$ which is practically correct at the temperature $t_x$ is approximate to an angular velocity obtained by using the light output value $P_{10}$ in the correlation curve of the temperature "$T=t_{e0}$", when the light output value $P_{1x}$ is detected at the temperature $t_x$, even if a correlation curve of the temperature $t_x$ is not stored in the memory 18. Thus, the calculated angular velocity $\Omega_x$ is supplied to an output circuit (not shown).

In this preferred embodiment, although the light output value $P_{10}$ at the temperature $t_0$ which is lower than the detected temperature $t_x$ is based on the calculation, the light output value $P_{12}$ at the temperature $t_2$ which is higher than the detected temperature $t_x$ may be based thereon as defined by an equation (6).

$$P_{12} = P_{1x} + (t_x - t_{e0}) X (P_{12} - P_{10}) / (T_2 - t_{e0}) \tag{6}$$

The process of calculating an angular velocity will be explained in more detail in FIGS. 5 and 6.

Here, it is assumed that a light output value $P_x$ and a detected temperature $t_x$ are supplied to the logic circuit 16. In the logic circuit 16, two correlation curves "$T=t_0$" and "$T=t_2$" which meet a temperature relation "$t_2 > t_x > t_0$" are selected from those stored in the memory 18 as shown in FIG. 5. In accordance with the two correlation curves, angular velocities $\Omega_0$ and $\Omega_2$ are determined dependent on the light output value $P_x$. Then, an intermediate value of an angular velocity $\Omega_{20}$ is selected between the angular velocities $\Omega_0$ and $\Omega_2$, and light output values $P_{10}$ and $P_{20}$ are determined dependent on the intermediate angular velocity $Q_{20}$ by using the two correlative curves as shown in FIG. 5.

Figure 6:
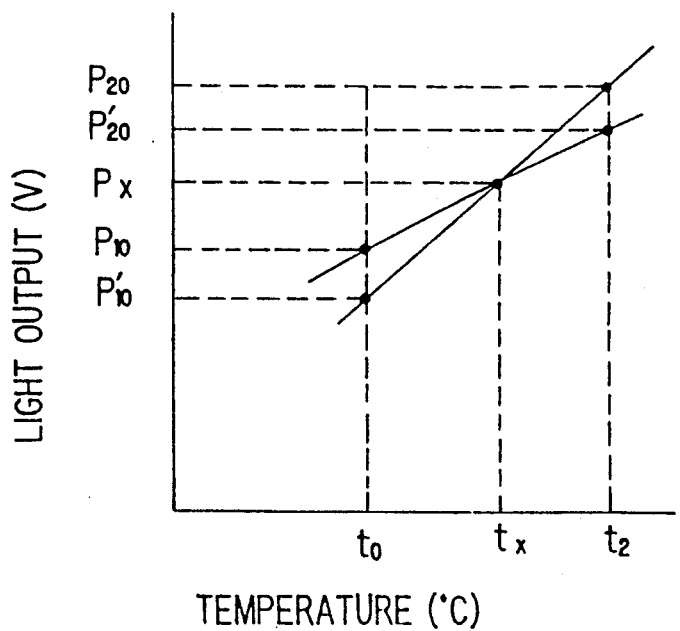

The two light output values $P_{10}$ and $P_{20}$ are plotted to correspond to the two temperatures $t_0$ and $t_2$ as shown in FIG. 6, and the detected light output value $P_x$ is then put on a line corresponding to the detected temperature $t_x$ in the same manner. Then, the two points for ($t_0$, $P_{10}$) and ($t_x$, $P_x$) or ($t_x$, $P_x$) and ($t_2$, $P_{20}$) are connected by a straight line, and a light output value $P'_{10}$ or $P'_{20}$ is determined by a crossing point between one selected straight line and a corresponding one of the two lines of the temperatures $t_0$ and $t_2$ as shown in FIG. 6.

Figure 5:
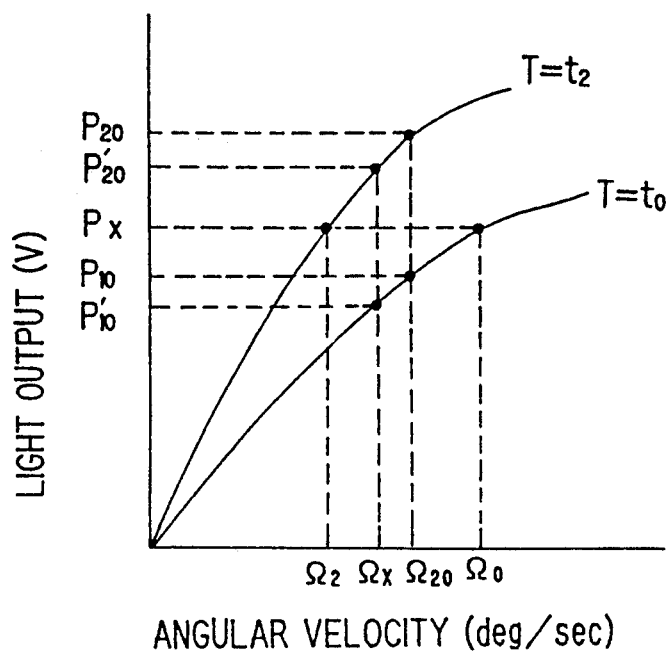
FIGS. 5 and 6 are graphs showing how to calculate an angular velocity in the preferred embodiment by using correlation maps.

Finally, an angular velocity $\Omega_x$ is determined in FIG. 5 by putting the light output value $P'_{10}$ or $P'_{20}$ on the correlative curve "$T=t_0$" or "$T=t_2$".

In the invention, it is preferable that correlation curves are prepared to have equal division values of light outputs at a predetermined temperature, so that equal approximations are obtained for detected light output values.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A fiber optic rotation sensor, comprising:
   a light source for emitting a light signal;
   means for dividing said light signal into first and second light signals;
   an optical fiber sensing loop for propagating said first and second light signals in clockwise and counterclockwise directions, respectively;
   means for detecting light output signals composed of said first and second light signals after propagation through said optical fiber sensing loop;
   a sensor for detecting an ambient temperature of said optical fiber sensing loop;
   a memory for storing at least two correlation maps each defining a correlation between a light output value and an angular velocity at a temperature different from others; and
   a logic circuit for calculating an angular velocity of said optical fiber sensing loop in accordance with said light output signals and said ambient temperature by using two of said at least two correlation maps.

2. A fiber optic rotation sensor, according to claim 1, further comprising:
   a phase modulator for shifting a phase difference of said light output signals by $\pi/2$ prior to supply of said light output signals to said logic circuit.

3. A fiber optic rotation sensor, according to claim 2, wherein:
   said memory stores at least three correlation maps providing at least three light output values having an equal difference there among at a predetermined angular velocity.

4. A fiber optic rotation sensor, according to claim 1, wherein:
   said logic circuit, selects two correlation maps of two temperatures, between which said ambient temperature ranges; determines two angular velocities corresponding to a light output value determined by said light output signals by using said two correlation maps; determines two light output values corresponding to an intermediate value of said two angular velocities; determines a light output value at one of said two temperatures by using a line connecting a first point defined by a remaining one of said two temperatures and one of said two light output values corresponding to said one of said two temperatures; and finally provides an angular velocity in accordance with the determined light output value by using one of said two correlation maps corresponding to said one of said two temperatures.

* * * * *